Oct. 11, 1932. F. COWIE 1,882,276
FIRE PREVENTION DEVICE FOR JINEMATOGRAPH FILM APPARATUS
Filed Sept. 17, 1930   2 Sheets-Sheet 2
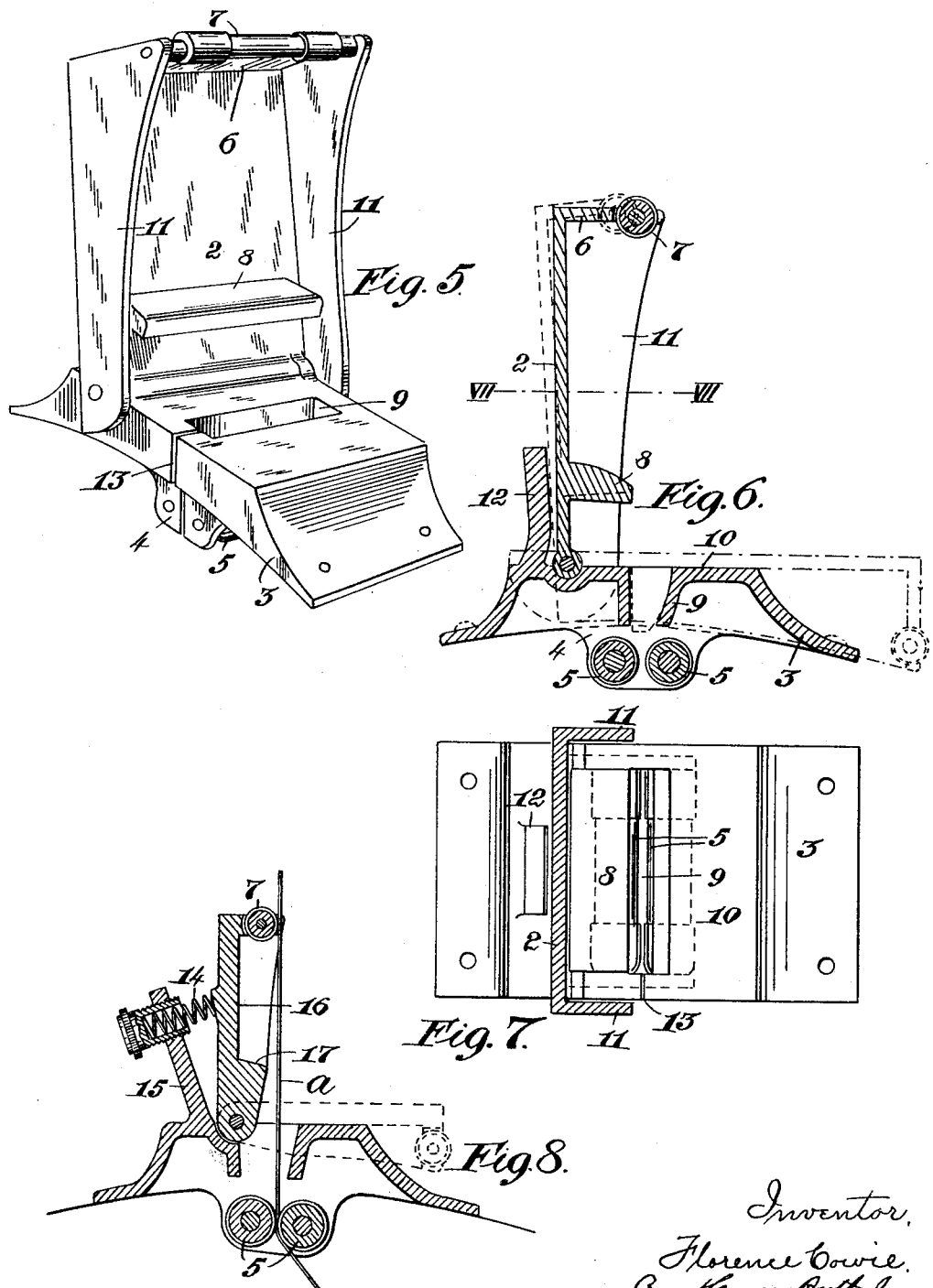

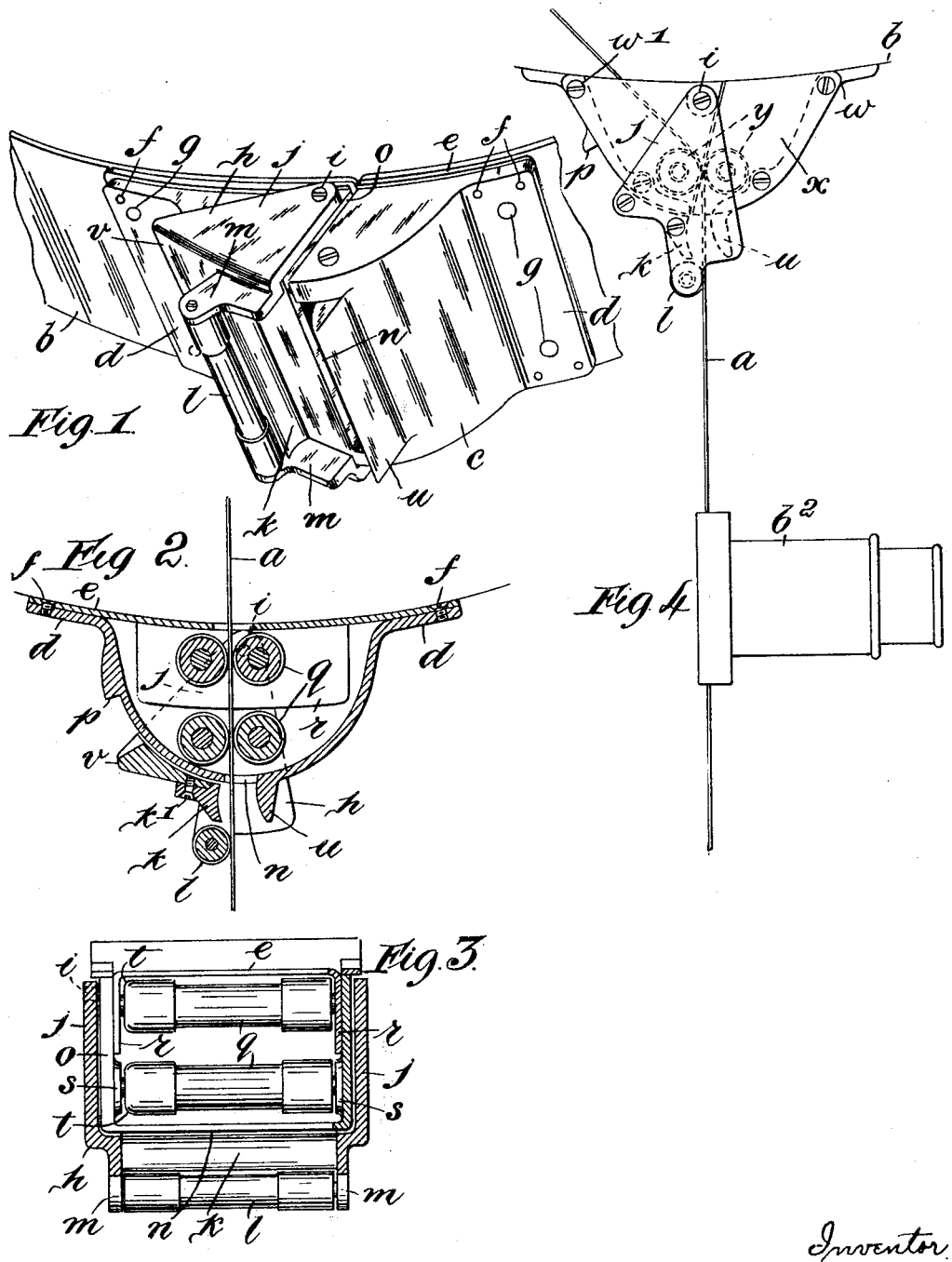

Patented Oct. 11, 1932

1,882,276

UNITED STATES PATENT OFFICE

FLORENCE COWIE, OF EALING, LONDON, ENGLAND

FIRE PREVENTION DEVICE FOR CINEMATOGRAPH FILM APPARATUS

Application filed September 17, 1930, Serial No. 482,629, and in Great Britain September 23, 1929.

This invention comprises improvements in and connected with fire prevention devices for cinematograph film apparatus and the object of the invention is to provide a simple attachment for film apparatus which shall be completely effective for preventing spread of fire along a film. Usually, the attachment will be most advantageously employed in connection with the mouthpieces through which a film passes in its passages from the unwinding spool to the winding-on spool in a cinematograph projector.

According to this invention the fire prevention device or attachment takes the form of a self-acting nipping or snuffing device which normally is kept in an open condition by the tensioned film but which instantly closes on to the film if the tension is released. Thus, if the exposed portion of a film takes fire, there is a breakage and consequently loss of tension. The flame runs up the depending film portion towards the unwinding spool but cannot get past the upper nipping device which has automatically closed upon the film.
The flame also runs down or along the lower film portion the travel of which is continuing towards the winding spool. In this case, the prevention device may be said to perform a snuffer action upon the flaming or smouldering end as the latter is drawn through the said device. The self-acting snuffing device may be adapted for taking a grip on the film when the latter breaks and for bending the film to an angular, curved or tortuous form.
The snuffing device advantageously takes its grip in such a manner that the pull on the film after it has broken causes the grip to be tightened. Thus the self-acting device may be provided with a wedge adapted for entering and closely fitting into the mouth of the spool container when the device closes on to the film. Consequently although the speed of the winding on spool may tend to accelerate after the breakage of the film, this has the effect of causing the film to be more tightly gripped in the mouth by the wedge. As a result the film is effectively held and flame is prevented from entering the spool container. If desired the device may be provided with a concave curved plate adapted for engaging with a curved convex film-guiding member on the mouth piece of the spool casing. Thus the curved members close over each other when the film breaks so as to grip the film tightly between them. The feeler or detector of the overbalancing means for operating the snuffing device advantageously engages the film at some little distance in advance of the position of the snuffing device.

In order to enable the invention to be readily understood, reference will be made to the accompanying drawings illustrating several examples of construction for carrying the invention into effect, in which drawings:—

Figure 1 is a perspective view of one construction of device in accordance with these improvements applied to an unwinding spool container.

Figure 2 is a central vertical section of the device shown in Figure 1.

Figure 3 is a section taken on the plane of the film Figure 2.

Figure 4 is an elevation showing safety device in accordance with these improvements applied to the unwinding film container of cinematograph apparatus.

Figure 5 is a perspective view of a modified construction of device for use in connection with a winding-on spool casing.

Figure 6 is a central vertical section of the device shown in Figure 5.

Figure 7 is a plan of Figure 6 and

Figure 8 is a central vertical section of a further modified construction.

Referring to Figures 1, 2 and 3 the film $a$ descends vertically from an upper unwinding spool box or container $b$ to a projector and thence to a lower or winding-on spool box or container, not shown. Each spool box may be provided with a fire prevention device in accordance with these improvements but in the present construction only the application to the upper box will be described. The mouthpiece of the spool box $b$ is provided with a fitting $c$ which as shown in Figure 2 may be the segment of a cylinder. The fitting is formed with lugs $d$ and is secured to a curved base plate $e$ by screws $f$. The plate $e$ is curved to fit against the cylindrical spool box and the fitting is attached to the latter by screws $g$. The fitting $c$ is provided with a swinging jaw device or cradle $h$ pivotally mounted on trunnions $i$ coaxial with the cylindrical surface of the fitting $c$. The said cradle device comprises segmental plates $j$ on each side of the fitting $c$ and a lip $k$ is attached to the lower end of said device by screws $k'$. A guide roll $l$ is also mounted between lugs $m$ on the plates just beneath the lip $k$. The curved wall of the fitting $c$ is formed with an opening $n$ for the passage of the film through the device, and one of the side walls may be formed with a narrow slit $o$ for the lateral insertion of the film into the device. In order to permit such insertion the swinging jaw $h$ is held by hand in the position shown in Figure 1 so as to uncover the slit $o$. A stop $p$ may be formed or provided on the fitting $c$ for restricting the backward movement of the swinging jaw. The interior of the fitting may be provided with anti-friction guide rollers $q$ for guiding the film through the opening $n$. The upper set of rollers may be mounted in down-turned portions $r$ of the base plate $e$ and the lower set may be mounted in bosses $s$ on the side walls of the fitting. The ends of such rollers $q$ may be chamfered or curved at $t$ at the end adjacent the slit $o$ for facilitating insertion of the film. A fixed lip $u$ is formed or provided on the fitting $e$ on one side of the opening $n$ and the swinging jaw is adapted to swing so as to bring the swinging lip $k$ into close contact with the fixed lip for closing the opening $n$. These lips are advantageously slightly curved as shown to suit the direction of curl which the film ends may acquire when the film breaks. The swinging jaw $h$ is counter-weighted as by providing an additional mass of metal on one side at $v$. Thus there is a constant tendency to bring the lips into close contact. During normal running however the tension of the film $a$ maintains the swinging jaw in the position shown in Figure 2, in which, owing to the engagement of the film with the guide roller $l$ the lips $k$ $u$ are prevented from making contact. The roller $l$ thus acts as a feeler or detector device. If the film breaks, as will happen if the exposed portion takes fire, the tension of the film is released. Thus the swinging jaw is permitted to swing with the result that the lips $k$ $u$ close snugly upon the film from opposite sides so as to close the opening $n$, so that the progress of the flame up the film into the box $b$ is prevented. The lips make contact with an extended length of the film.

Figure 4 illustrates the application of a device in accordance with these improvements to an unwinding spool box $b$, the projector being indicated at $b^2$. The construction of the fitting is similar to that shown in Figures 1 to 3. Steel plates $x$ are mounted on the sides of the cylindrical wall portion $w$ by screws $w'$ and a single pair of guide rollers $y$ is mounted between such plates.

The film passes from the projector $b^2$ to a winding-on spool fitted with a device shown in Figures 5 to 7. Referring to these figures a flat gravity operated swinging plate 2 is pivotally mounted at one end to a base member 3. The latter is fitted around the mouthpiece of the spool box and is provided with downwardly depending lugs 4 at each side for the mounting of film-guiding rollers 5. The free end of the plate is formed as a right angled extension 6 and an anti-friction guide roll 7 is provided at this end for guiding the film from the projector to the container. The plate is normally maintained in the raised position by the tension of the film $a$, but upon breakage of the film the plate falls by gravity into the position indicated by dot and dash lines Figure 6, so as to close on to the film. The plate is formed or provided near its pivoted end with a wedge 8 adapted for entering and closely fitting into the mouthpiece 9 of the base member 3. Thus when the plate 2 falls upon release of tension of the film, as when an exposed portion of the film catches fire, the wedge 8 enters the mouth 9 and tightly jams the film to prevent the flame frow entering the spool container. Any further pull imparted to the film by the winding-on device causes the film to be more tightly gripped by the wedge in the mouth. The plate may also make a flat surface contact 10 with the upper surface of the base member in the safety position, for assisting in snuffing the flame. The guide roller 7 is suitably at some little distance in advance of the wedge 8 which is disposed near to the pivotal end of the plate. Thus the wedge is enabled to enter the mouth 9 before the flame has opportunity of travelling down the film, and a quick closing of the mouth is possible. The sides of the plate 2 may be formed with downwardly projecting shields 11 which pass over the sides of the base member 3 when the plate falls, for preventing lateral spreading of the flame.

It is usual in film winding mechanism to employ a winding-on spool which slips when the speed of winding tends to become excessive. With such mechanisms the grip exerted by the wedge or snuffing device 8 will overcome the pull which the slipping drive is capable of exerting, so that the flaming end of the film will not be drawn through the mouthpiece 9 into the winding-on spool casing. Moreover, in all cases the snuffing device in addition to exerting a grip on the film will also offer an extended or tortuous path through which it is impossible for the flame to pass. The base member 3 may be formed with a stop device 12 for preventing the plate from being tilted too far backwards when the film is to be entered in the device. The base member may be provided with a slit 13 communicating with the mouthpiece 9 for the purpose of inserting the film.

According to the modified construction shown in Figure 8 a light helical compression spring 14 is provided in association with the stop device 15. Thus in the raised position of the plate 16 the spring is slightly compressed. Thus when the tension of the film *a* is released the tendency of the plate 16 to fall is assisted by the spring 14. The wedge 17 may be formed around the pivotal end of the plate as shown. A spring of the nature shown in this construction may also be employed in connection with the construction shown in Figures 5 to 7.

I claim:—

1. Fire prevention device for film spool casings, comprising a fitting formed with a flat upper surface and a wedge shaped mouthpiece, a tumbler pivotally mounted on said fitting, an anti-friction roller projecting forwardly from the free end of said tumbler and adapted to be engaged by the tensioned film passing through said mouthpiece to maintain the tumbler normally in an upright position, the antifriction roller being located vertically above the mouthpiece, a blunt-ended wedge formation projecting from a flat surface of the said tumbler and disposed closely adjacent the pivot mounting, said wedge formation being adapted to fit into said wedge-shape mouthpiece and the flat face of said tumbler being adapted to engage with the flat surface of the fitting when the tumbler falls forwardly due to release of tension on the film substantially as set forth.

2. Fire prevention device for film spool casings, comprising a fitting formed with a wedge shaped mouthpiece and a flat upper surface, a tumbler pivotally mounted on said fitting, an antifriction roller projecting forwardly from the free end of said tumbler and adapted to be engaged by the tensioned film passing perpendicularly through said mouthpiece to maintain the said tumbler normally in an upright position, a blunt-ended wedge formation projecting forwardly from said tumbler closely adjacent the pivot mounting thereof and adapted for wedging into said mouthpiece when the tumbler falls on release of tension on the film, and forwardly projecting wing members on the sides of said tumbler adapted for passing over the sides of the fitting for obstructing lateral escape of flame from the mouthpiece after the fall of said tumbler.

3. Fire prevention device for film spool casings, comprising a fitting formed with a flat upper surface and a wedge shaped mouthpiece located directly beneath the projector, a gravity influenced plate pivotally mounted on said fitting, an antifriction roller projecting forwardly from the free end of said plate and adapted to be engaged by the tensioned film passing through said mouthpiece to maintain the pivotal plate normally in an upright position with the antifriction roller located vertically above the mouthpiece, resilient means operative for influencing said plate to move to the safety position, and a blunt-ended wedge formation projecting forwardly from said plate closely adjacent the pivot mounting thereof and leaving a free flat surface between said wedge and antifriction roller for engagement with the flat surface of the fitting when the plate falls forwardly due to release of tension on the film and the said wedge adapted to enter the mouthpiece to tightly grip and hold the film over an extended area.

4. Fire prevention device for film spool casings, comprising a fitting formed with a flat upper surface and a wedge shaped mouthpiece, located beneath the film projector, a plate actuated by gravity pivotally mounted on said fitting, an antifriction roller projecting forwardly from the free end of said plate and adapted to be engaged by the tensioned film passing through said mouthpiece to maintain the pivotal plate normally in an upright position with the antifriction roller located vertically above the mouthpiece, a stop member on the rear of said fitting adapted for preventing excessive backward tilting of the plate, resilient means operative for influencing said plate to move to the safety position, and a blunt-ended wedge formation projecting forwardly from said plate closely adjacent the pivot mounting thereof and leaving a free flat surface between said wedge and anti-friction roller for engagement with the flat surface of the fitting when the plate falls forwardly due to release of tension on the film and the said wedge adapted to enter the mouthpiece to tightly grip and hold the film over an extended area.

5. Fire prevention device for film spool casings, comprising a fitting formed with a flat upper surface and a wedge-shaped mouthpiece located directly beneath the projector, a gravity influenced plate pivotally mounted on said fitting, an antifriction roller projecting forwardly from the free end of said plate and adapted to be engaged by the tensioned film passing through said mouthpiece to maintain the pivotal plate normally in an upright position with the antifriction roller located vertically above the mouthpiece, a stop member on the rear of said fitting for engaging the rear of said plate, a spring mounted on said member and operative for influencing said plate to fall forwardly to the safety position, and a blunt-ended wedge formation projecting forwardly from said plate closely adjacent the pivot mounting thereof and leaving a free flat surface between said wedge and antifriction roller for engagement with the flat surface of the fitting when the plate falls forwardly due to release of tension on the film and the wedge enters the mouthpiece for tightly gripping and holding the film over an extended area.

6. Fire prevention device for a film spool casing comprising a mouthpiece with a grooved surface, a tumbler pivoted to said mouthpiece and provided near its pivot with a wedge designed to enter said mouthpiece and cooperate with the groove in said surface to grip and hold the film, an antifriction feeler device on said tumbler spaced from the pivot thereof, said feeler being normally engaged by the tensioned film to maintain said tumbler upright and the parts being so disposed that wedge-tightness is increased by the pull of the film when the tumbler is permitted by film release of tension to fall and bring about wedge engagement.

FLORENCE COWIE.